(12) United States Patent
Blair et al.

(10) Patent No.: US 10,695,783 B2
(45) Date of Patent: Jun. 30, 2020

(54) SYSTEM CONTROL BASED ON ACOUSTIC SIGNALS

(71) Applicants: Rolls-Royce Corporation, Indianapolis, IN (US); Virginia Tech Intellectual Properties, Inc., Blacksburg, VA (US); Commonwealth Center for Advanced Manufacturing, Disputanta, VA (US)

(72) Inventors: Taylor K. Blair, Indianapolis, IN (US); Michael Cybulsky, Indianapolis, IN (US); Gary Pickrell, Blacksburg, VA (US); Benjamin Zimmerman, Moseley, VA (US); Romesh Batra, Blacksburg, VA (US); Matthew R. Gold, Carmel, IN (US)

(73) Assignees: Rolls-Royce Corporation, Indianapolis, IN (US); Virginia Tech Intellectual Properties, Inc., Blacksburg, VA (US); Commonwealth Center for Advanced Manufacturing, Disputanta, VA (US)

( * ) Notice: Subject to any disclaimer, the term of this patent is extended or adjusted under 35 U.S.C. 154(b) by 42 days.

(21) Appl. No.: 15/833,546

(22) Filed: Dec. 6, 2017

(65) Prior Publication Data
US 2018/0154377 A1    Jun. 7, 2018

Related U.S. Application Data

(60) Provisional application No. 62/430,637, filed on Dec. 6, 2016.

(51) Int. Cl.
*B05B 12/00* (2018.01)
*B05B 1/30* (2006.01)
(Continued)

(52) U.S. Cl.
CPC ............ *B05B 12/004* (2013.01); *B05B 1/002* (2018.08); *B05B 1/30* (2013.01); *B05B 7/20* (2013.01);
(Continued)

(58) Field of Classification Search
CPC .......... B05B 1/30; B05B 15/18; B05B 1/002; B05B 7/20; B05B 7/222; B05B 12/08;
(Continued)

(56) References Cited

U.S. PATENT DOCUMENTS 2,099,074 A    11/1937    Mueller
2,361,458 A    10/1944    Converse
(Continued)

FOREIGN PATENT DOCUMENTS

DE    102015109873 A1    12/2016
EP    0481382 A1 *    4/1992    ........... B05B 12/082
(Continued)

OTHER PUBLICATIONS

Hou et al., "Acoustic Monitoring of Hydrocyclone Performance," Minerals Engineering, vol. 11, No. 11, Sep. 1998, pp. 1047-1059.
(Continued)

*Primary Examiner* — Thomas C Lee
*Assistant Examiner* — Michael Tang
(74) *Attorney, Agent, or Firm* — Shumaker & Sieffert, P.A.

(57) ABSTRACT

An example system includes at least one acoustic sensor configured to generate at least one time-dependent acoustic data signal indicative of an acoustic signal generated by a thermal spray system performing a process associated with a plurality of process attributes. The example system includes a computing device including an acoustic data signal module and a control module. The acoustic data signal processing module may transform the at least one
(Continued)

time-dependent acoustic data signal to a frequency-domain spectrum. The control module may determine a process attribute of the plurality of process attributes that deviates from a predetermined operating range by identifying at least one characteristic of the frequency-domain spectrum, selecting at least one component of the thermal spray system based on the process attribute, and controlling the thermal spray system to adjust the process attribute toward the predetermined operating range by sending a control signal to the at least one component.

16 Claims, 7 Drawing Sheets

(51) Int. Cl.
| | |
|---|---|
| G05B 15/02 | (2006.01) |
| B05B 7/22 | (2006.01) |
| B05B 7/20 | (2006.01) |
| B05B 1/00 | (2006.01) |
| G01N 29/46 | (2006.01) |
| G01N 29/14 | (2006.01) |
| G01N 29/44 | (2006.01) |
| C23C 4/12 | (2016.01) |
| B05B 15/18 | (2018.01) |
| G01N 29/11 | (2006.01) |
| B05B 12/08 | (2006.01) |

(52) U.S. Cl.
CPC ............. *B05B 7/222* (2013.01); *B05B 12/08* (2013.01); *B05B 15/18* (2018.02); *C23C 4/12* (2013.01); *G01N 29/11* (2013.01); *G01N 29/14* (2013.01); *G01N 29/4436* (2013.01); *G01N 29/4454* (2013.01); *G01N 29/46* (2013.01); *G05B 15/02* (2013.01); *B05B 7/22* (2013.01); *G01N 2291/021* (2013.01); *G01N 2291/0251* (2013.01); *G01N 2291/101* (2013.01)

(58) Field of Classification Search
CPC . B05B 7/22; C23C 4/12; G01N 29/11; G01N 29/14; G01N 29/4436; G01N 29/4454; G01N 29/46; G01N 2291/021; G01N 2291/0251; G01N 2291/101; G05B 15/02
See application file for complete search history.

(56) References Cited

U.S. PATENT DOCUMENTS

| | | | |
|---|---|---|---|
| 3,580,092 A | 5/1971 | Scarpa | |
| 4,550,615 A | 11/1985 | Grant | |
| 4,586,386 A | 5/1986 | Hollstein et al. | |
| 4,613,259 A | 9/1986 | Packer et al. | |
| 4,621,519 A | 11/1986 | Phillips | |
| 4,811,605 A | 3/1989 | Nadeau et al. | |
| 4,850,229 A | 7/1989 | Phillips | |
| 4,856,321 A | 8/1989 | Smalling et al. | |
| 4,905,897 A | 3/1990 | Rogers et al. | |
| 5,014,447 A | 5/1991 | Hagen | |
| 5,101,774 A | 4/1992 | Marziale et al. | |
| 5,180,921 A | 1/1993 | Moreau et al. | |
| 5,455,868 A | 10/1995 | Sergent | |
| 5,654,797 A | 8/1997 | Moreau et al. | |
| 5,757,498 A | 5/1998 | Klein, II et al. | |
| 5,912,471 A | 6/1999 | Schutz | |
| 5,928,731 A | 7/1999 | Yanagida et al. | |
| 5,986,277 A | 11/1999 | Bourque et al. | |
| 6,014,447 A | 1/2000 | Kohnen et al. | |
| 6,185,153 B1 | 2/2001 | Hynes et al. | |
| 6,437,694 B1 | 8/2002 | Lee | |
| 6,438,239 B1 | 8/2002 | Kuchen | |
| 6,507,023 B1 | 1/2003 | Parham et al. | |
| 6,684,702 B2 | 2/2004 | Ziada | |
| 6,853,951 B2 | 2/2005 | Jarrell et al. | |
| 6,940,409 B1 | 9/2005 | Green | |
| 6,988,857 B2 | 1/2006 | Kroemmer et al. | |
| 7,034,244 B2 | 4/2006 | Matus | |
| 7,043,069 B1 | 5/2006 | Heinrich et al. | |
| 7,114,889 B2 | 10/2006 | Kanou et al. | |
| 7,278,294 B2 | 10/2007 | Giles et al. | |
| 7,290,450 B2 | 11/2007 | Brown et al. | |
| 7,311,004 B2 | 12/2007 | Giles | |
| 7,389,278 B2 | 6/2008 | Unsworth et al. | |
| 7,499,836 B1 | 3/2009 | Mooney | |
| 7,665,348 B2 | 2/2010 | Giles | |
| 7,802,687 B2 | 9/2010 | Fritz et al. | |
| 7,881,884 B2 | 2/2011 | Perry et al. | |
| 7,891,315 B2 | 2/2011 | Barbezat | |
| 8,121,588 B2 | 2/2012 | Gottlieb | |
| 8,193,942 B2 | 6/2012 | White et al. | |
| 8,231,310 B2 | 7/2012 | Sanwald | |
| 8,250,907 B2 | 8/2012 | Giles | |
| 8,510,014 B2* | 8/2013 | Nomura | F02C 9/18 60/208 |
| 8,542,124 B2 | 9/2013 | Timm | |
| 9,062,682 B2 | 6/2015 | Loose et al. | |
| 9,099,074 B1 | 8/2015 | Lucon et al. | |
| 9,709,466 B2 | 7/2017 | Kwon et al. | |
| 10,241,091 B2 | 3/2019 | Cybulksy et al. | |
| 10,274,364 B2 | 4/2019 | Blair et al. | |
| 2002/0153117 A1 | 10/2002 | Allor et al. | |
| 2003/0087040 A1 | 5/2003 | Ladentin | |
| 2004/0030524 A1 | 2/2004 | Jarrell et al. | |
| 2005/0011278 A1 | 1/2005 | Brown et al. | |
| 2005/0041238 A1 | 2/2005 | Ludviksson et al. | |
| 2005/0241761 A1* | 11/2005 | Kannan | C23C 16/4405 156/345.24 |
| 2006/0071666 A1 | 4/2006 | Unsworth et al. | |
| 2007/0044572 A1 | 3/2007 | Davis et al. | |
| 2007/0264439 A1 | 11/2007 | Abdullahi et al. | |
| 2007/0279235 A1 | 12/2007 | Davis et al. | |
| 2008/0184793 A1 | 8/2008 | Mauchle et al. | |
| 2008/0189057 A1 | 8/2008 | Perry et al. | |
| 2009/0068978 A1 | 3/2009 | Gottlieb | |
| 2010/0071616 A1 | 3/2010 | Mauchle et al. | |
| 2010/0132439 A1 | 6/2010 | Giles | |
| 2011/0005420 A1 | 1/2011 | Fullerton | |
| 2011/0118998 A1 | 5/2011 | Loose et al. | |
| 2011/0308812 A1 | 12/2011 | Bullen | |
| 2012/0037074 A1 | 2/2012 | Outland | |
| 2013/0067992 A1* | 3/2013 | Sinha | G01N 29/036 73/24.04 |
| 2013/0243535 A1 | 9/2013 | Volonte et al. | |
| 2014/0010968 A1 | 1/2014 | Prest et al. | |
| 2014/0072125 A1 | 3/2014 | Cohn et al. | |
| 2014/0113840 A1 | 4/2014 | Margalit et al. | |
| 2014/0200837 A1* | 7/2014 | Blair | G01N 29/14 702/48 |
| 2015/0362418 A1 | 12/2015 | Newton et al. | |
| 2016/0223496 A1* | 8/2016 | Klos | G01H 1/003 |
| 2016/0354796 A1 | 12/2016 | Cybulsky et al. | |
| 2016/0356747 A1 | 12/2016 | Cybulsky et al. | |
| 2018/0154377 A1 | 6/2018 | Blair et al. | |

FOREIGN PATENT DOCUMENTS

| | | |
|---|---|---|
| EP | 0481382 A1 | 4/1992 |
| EP | 1205748 A1 | 5/2002 |
| EP | 1336841 A2 | 8/2003 |
| EP | 1036856 A1 | 8/2005 |
| EP | 3128321 A1 | 2/2017 |
| WO | 2005085489 A1 | 9/2005 |
| WO | 2014110486 A1 | 4/2014 |
| WO | 2016172316 A1 | 10/2016 |

OTHER PUBLICATIONS

Extended Search Report from counterpart European Application No. 17205554.3, dated May 24, 2018, 8 pp.

(56) References Cited

OTHER PUBLICATIONS

Xi, et al., "Monitoring of Nozzle Wear during Plasma Spray," Thermal Spray 1997: A United Forum for Scientific and Technological Advances, ASM International., Sep. 15-18, 1997, 6 pp.

Lenain et al., "New Approaches of the Forecast of the Aging of Plasma Jet Nozzle in Industrial Settings of Thermal Spraying," University of Limoges, https://hal.archives-ouvertes.fr/hal-00609693, Sep. 23, 2011, 20 pp.

Leblanc et al., "Long Term Stability of Plasma Spraying: Study of the Evolution of the In-Flight Particle State Coating Microstructure, Voltage and Acoustic Signatures," In Tagungsband Conference Proceedings., Journal of Thermal Spray Technology, vol. 11 (3), Sep. 2002, 7 pp.

Rigot "Contribution of the study of the electrode erosion in dc plasma spray torches through the on-line following of voltage and sound signals," Nov. 2003, University of Limoges, 3 pp.

Kanta et al., "Artificial Neural Networks vs. Fuzzy Logic: Simple Tools to Predict and Control Complex Processes—Application to Plasma Spray Processes," Journal of Thermal Spray Technology, vol. 17, No. 3, Sep. 2008, pp. 365-376.

Braeuel et al., "An Acoustic Method for the Detection of Defects in the Nozzle of Plasma Cutting Torches," IEEE Transactions on Ultrasonics, Ferroelectrics, and Frequency Control, Mar. 1987, 4 pp.

Faisal et al., "Application of acoustic emission for monitoring the HVOF thermal spraying process," 27th European Working Group on Acoustic Emission, Sep. 21, 2006, 15 pp.

Kovacevic et al., "On-line monitoring of the electric arc-spraying process based on acoustic signatures," Journal of Engineering Manufacture, vol. 209, Oct. 1, 1995, 11 pp.

Rat et al., "Acoustic signature analysis of the interaction between a dc plasma jet and a suspension liquid jet," Journal of Physics D: Applied Physics, Sep. 18, 2009, 13 pp.

Read, International Thermal Spray Association, Keynote address, China International Thermal Spray Conference and the 16th National Thermal Spraying Seminar, Dalian, China, Sep. 22-25, 2003, 68 pp.

Umeda et al., "On the sound sources of screech tones radiated from choked circular jets", The Journal of the Acoustical Society of America, vol. 110, No. 4, Oct. 2001, 14 pp.

Response to Extended Search Report dated May 24, 2018, from counterpart European Application No. 17205554.3, filed Dec. 10, 2018, 33 pp.

Intent to Grant dated May 17, 2019, from counterpart European Application No. 17205554.3, 54 pp.

Adams et al., "A Condition Monitoring System for Low Vacuum Plasma Spray using Computer Vision", 2018 IEEE International Conference on Prognostics and Health Management (ICPHM), Sep. 2018, 7 pgs.

Blair, "Development of a Plasma Spray Process Monitoring System through Aeroacoustic Signal Analysis", Feb. 17, 2015, 157 pgs.

\* cited by examiner

SYSTEM CONTROL BASED ON ACOUSTIC SIGNALS

This application claims the benefit of U.S. Provisional Application No. 62/430,637, filed Dec. 6, 2016, which is incorporated by reference in its entirety.

TECHNICAL FIELD

The disclosure relates to controlling systems based on acoustic signals.

BACKGROUND

Thermal spray systems are used in a wide variety of industrial applications to coat targets with coating material to modify or improve the properties of the target surface. Coatings may include thermal barrier coatings, hard wear coatings, ablative coatings, or the like. Thermal spray systems use heat generated electrically, by plasma, or by combustion to heat material injected in a plume, so that molten material propelled by the plume contacts the surface of the target. Upon impact, the molten material adheres to the target surface, resulting in a coating.

SUMMARY

In some examples, the disclosure describes an example system including at least one acoustic sensor configured to generate at least one time-dependent acoustic data signal. The at least one time-dependent acoustic data signal is indicative of an acoustic signal generated by a thermal spray system performing a process associated with a plurality of process attributes. The example system also includes a computing device including an acoustic data signal processing module and a control module. The acoustic data signal processing module is configured to receive the at least one time-dependent acoustic data signal, and transform the at least one time-dependent acoustic data signal to a frequency-domain spectrum. Each process attribute of the plurality of process attributes is associated with at least one respective frequency band. The control module is configured to determine a process attribute of the plurality of process attributes that deviates from a predetermined operating range by identifying at least one characteristic of the frequency-domain spectrum. The control module is also configured to select at least one component of the thermal spray system based on the process attribute. The at least one component is associated with the process attribute. The control module is also configured to control the thermal spray system to adjust the process attribute toward the predetermined operating range by sending a control signal to the at least one component.

In some examples, the disclosure describes an example technique for controlling a thermal spray system. The example technique includes receiving, by a computing device, from at least one acoustic sensor, at least one time-dependent acoustic data signal. The at least one time-dependent acoustic data signal is indicative of an acoustic signal generated by a thermal spray system performing a process associated with a plurality of process attributes. The example technique includes transforming, by the computing device, the at least one time-dependent acoustic data signal to a frequency-domain spectrum. Each process attribute of the plurality of process attributes is associated with at least one respective frequency band. The example technique includes determining, by the computing device, a process attribute of the plurality of process attributes that deviates from a predetermined operating range by identifying at least one characteristic of the frequency-domain spectrum. The example technique includes selecting, by the computing device, at least one component of the thermal spray system based on the process attribute. The at least one component is associated with the process attribute. The example technique includes controlling, by the computing device, the thermal spray system to adjust the process attribute toward the predetermined operating range by sending a control signal to the at least one component.

In some examples, the disclosure describes an example computer readable storage medium. The example computer readable storage medium includes instructions that, when executed, cause at least one processor to receive, from at least one acoustic sensor, at least one time-dependent acoustic data signal. The at least one time-dependent acoustic data signal is indicative of an acoustic signal generated by a thermal spray system performing a process associated with a plurality of process attributes. The instructions, when executed, cause the at least one processor to transform the at least one time-dependent acoustic data signal to a frequency-domain spectrum. Each process attribute of the plurality of process attributes is associated with at least one respective frequency band. The instructions, when executed, cause the at least one processor to determine a process attribute of the plurality of process attributes that deviates from a predetermined operating range by identifying at least one characteristic of the frequency-domain spectrum. The instructions, when executed, cause the at least one processor to select at least one component of the thermal spray system based on the process attribute. The at least one component is associated with the process attribute. The instructions, when executed, cause the at least one processor to control the thermal spray system to adjust the process attribute toward the predetermined operating range by sending a control signal to the at least one component.

The details of one or more examples are set forth in the accompanying drawings and the description below. Other features, objects, and advantages will be apparent from the description and drawings, and from the claims.

DETAILED DESCRIPTION

Figure 1:
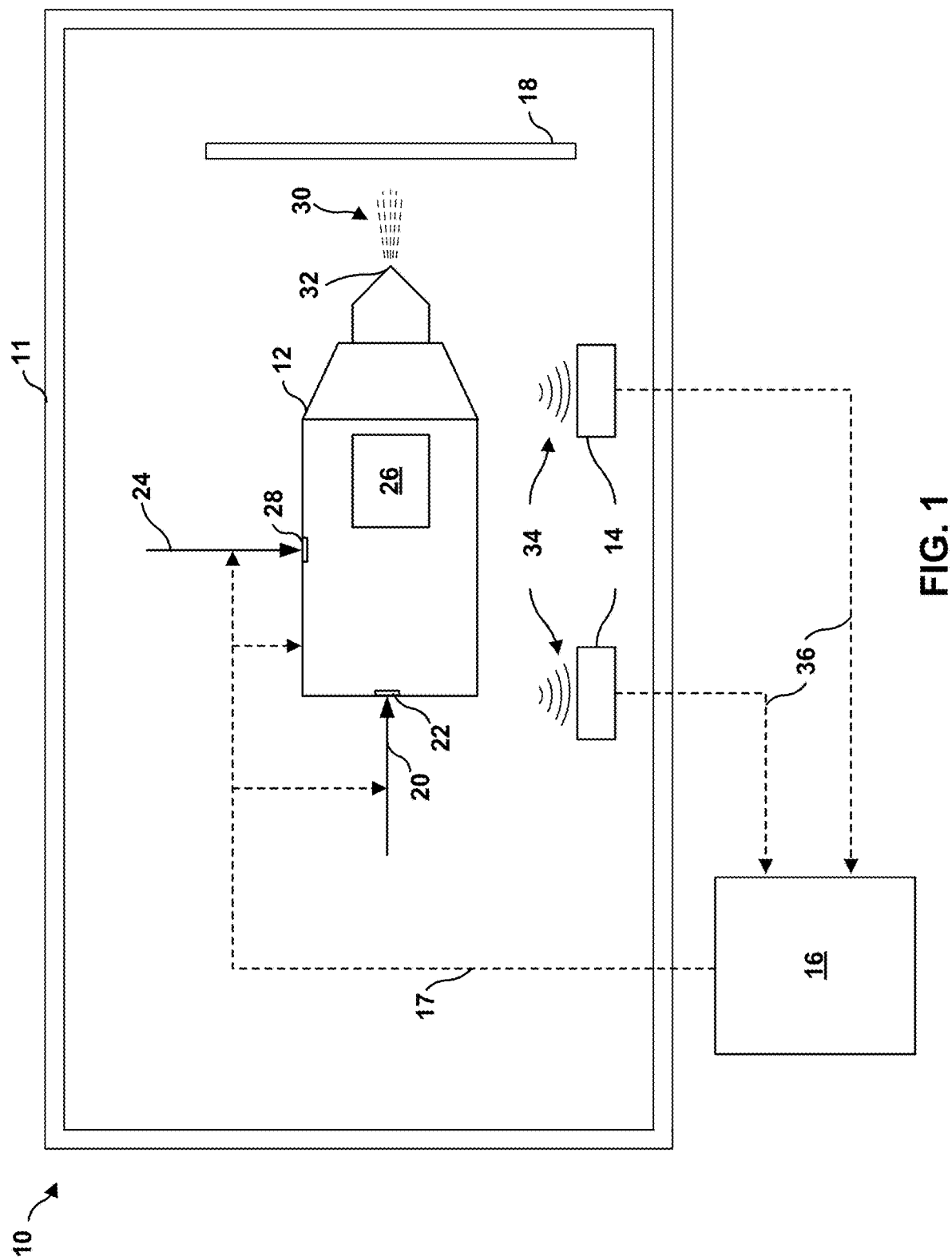
FIG. 1 is a conceptual block diagram illustrating an example thermal spray system performing a process and including a computing device for controlling the process by adjusting a process attribute in response to an acoustic signal generated by the thermal spray system.

The disclosure describes systems and techniques for controlling a thermal spray system to adjust a process attribute in response to an acoustic signal generated by the thermal spray system. The thermal spray system may include at least one system component, such as a spray gun, a powder feed system, a gas feed system, or like. During a thermal spray process, the spray gun receives spray material and a carrier gas, at least partially melts the spray material, and directs the at least partially melted spray material toward a spray target using the carrier gas. The at least partially melted spray material contacts the spray target to coat the spray material on the spray target. In some examples, the quality of the coating on the spray target may depend on process attributes including, for instance, the spray material composition, flow rate, and flow rate consistency; the carrier gas composition, temperature, flow rate, and flow rate consistency; the spray target composition and shape; the condition of the at least one system component (e.g., the spray gun); and the like. Unsatisfactory coating characteristics may result from variances in process attributes, including process parameters, component wear, or both.

During operation of the thermal spray system, the at least one component may generate an acoustic signal (e.g., sound), which may be associated with thermal spray parameters, a condition of the at least one component, or both. The thermal spray system may include at least one acoustic sensor configured to generate at least one time-dependent acoustic data signal representative of the acoustic signal generated by the at least one component. The system also may include a computing device configured to analyze the at least one time-dependent acoustic data signal and control at least one process attribute based on the at least one time-dependent acoustic data signal.

The time-dependent acoustic data signal may be rich in information, and may include data representative of acoustic signals generated by one or more component of the thermal spray system. The acoustic signals may also be representative of process attributes or variations in process attributes. For example, an acoustic signal generated by the spray gun may depend upon process attributes including, for example, geometry of the spray gun nozzle, including wear of the spray gun nozzle, powder flow rate, powder flow pulsing, gas flow rate, powder composition, or the like. In this way, the computing device may analyze the time-dependent acoustic data signal to determine whether process attributes associated with the spray gun are within a nominal or expected range, or if the process attributes are varying compared to an expected value. The computing device then may control at least one process attribute, such as powder flow rate, gas flow rate, powder composition, or the like, to maintain or adjust the process attributes to be within the nominal or expected range, or within a threshold amount of the expected value.

In some examples, the thermal spray system may include a plurality of acoustic sensors, and respective acoustic sensors may be positioned near respective system components of the thermal spray process. In some examples, each acoustic sensor of the plurality of acoustic sensors may generate a respective at least one time-dependent acoustic data signal. Because of the different positions of the respective acoustic sensors, the computing device may analyze the respective time-dependent acoustic data signals to determine information related to respective components of the thermal spray system. For example, each respective time-dependent acoustic data signal may be associated with the respective component to which the respective acoustic sensor is near. Alternatively, or additionally, the computing device may utilize the intensity of respective frequency components of at least one time-dependent acoustic data signal to determine, e.g., based on distance, to which component the sound may be attributed. In this way, the computing device may analyze the time-dependent acoustic data signal or time-dependent acoustic data signals to determine process attributes for a plurality of components of the thermal spray system. For example, the computing device may compare a spectrum of the acoustic data signal with a baseline spectrum, and based on the comparison, may select a process attribute of a plurality of process attributes.

The computing device may control the thermal spray system by adjusting at least one process attribute associated with at least one system component based on the at least one time-dependent acoustic data signal. In some examples, the computing device may adjust the process attribute by selecting at least one system component of the thermal spray system based on the process attribute and determining a control signal for the system component based on the comparison of the spectrum of the acoustic data signal with the baseline spectrum. The computing device may send the control signal to the selected at least one system component to adjust the process attribute. For example, the computing device may determine a control signal that controls the at least one system component to cause the process attribute to remain or be adjusted to be within a nominal or expected range, or within a threshold amount of the expected value.

Thus, example systems and techniques according to the disclosure may be used to adjust a process parameter of the thermal spray system, based on an acoustic signal generated by the thermal spray system. By utilizing the at least one time-dependent acoustic data signal, the thermal spray system described herein may perform real-time or near real-time control of operation of at least one component of the thermal spray system. Further, controlling the thermal spray system by monitoring a time-dependent acoustic data signal representative of one or more outputs of the thermal spray system may provide a more accurate control of the thermal spray system, e.g., compared to controlling the thermal spray system by monitoring inputs to the thermal spray system using a flow meter, flow controller, amp meter, or voltmeter, as the acoustic signal may be representative of outputs of the thermal spray system. Further, in some examples, flow meters, flow controllers, amp meters, and voltmeters may require calibration, and falling out of calibration may reduce the accuracy of the feedback provided by out-of-calibration flow meters, flow controllers, amp meters, and voltmeters. Thus, systems and techniques according to the disclosure provide near real-time feedback to an operator or a process controller for controlling components of thermal spray systems to adjust process attributes, or to shut down the components or the system, as appropriate.

FIG. 1 is a block diagram illustrating an example thermal spray system 10. In some examples, thermal spray system 10 includes components such as an enclosure 11, a thermal spray gun 12, at least one acoustic sensor 14, and a computing device 16.

Enclosure 11 encloses some components of thermal spray system 10, including, for example, thermal spray gun 12 and at least one acoustic sensor 14. In some examples, enclosure 11 substantially completely surrounds thermal spray gun 12 and at least one acoustic sensor 14 and encloses an atmosphere. The atmosphere may include, for example, air, an inert atmosphere, a vacuum, or the like. In some examples, the atmosphere may be selected based on the type (e.g., composition) of coating being applied using thermal spray system 10, the composition of spray target 18, or both. Enclosure 11 also encloses a spray target 18.

Spray target 18 includes a substrate to be coated using thermal spray system 10. In some examples, spray target 18 may include, for example, a substrate on which a bond coat, a primer coat, a hard coat, a wear-resistant coating, a thermal barrier coating, an environmental barrier coating, or the like is to be deposited. Spray target 18 may include a substrate or body of any regular or irregular shape, geometry or configuration. In some examples, spray target 18 may include metal, plastic, glass, or the like. Spray target 18 may be a component used in any one or more mechanical systems, including, for example, a high temperature mechanical system such as a gas turbine engine.

Thermal spray gun 12 is coupled to a gas feed line 20 via gas inlet port 22, is coupled to a material feed line 24 via material inlet port 28, and includes or is coupled to an energy source 26. Gas feed line 20 provides a gas flow to gas inlet port 22 of thermal spray gun 12. Depending upon the type of thermal spray process being performed, the gas flow may be a carrier gas for the coating material, may be a fuel that is ignited to at least partially melt the coating material, or both. Gas feed line 20 may be coupled to a gas source (not shown) that is external to enclosure 11.

In some examples, thermal spray gun 12 also may include a material inlet port 28, which is coupled to material feed line 24. Material feed line 24 may be coupled to a material source (not shown) that is located external to enclosure 11. Coating material may be fed through material feed line 24 in powder form, and may mix with gas from gas feed line 20 within thermal spray gun 12. In other examples, thermal spray gun 12 may omit material inlet port 28, and material feed line 24 may provide the coating material to exit flowstream 30 outside thermal spray gun 12 near outlet 32. The composition of the coating material may be based upon the composition of the coating to be deposited on spray target 18, and may include, for example, a metal, an alloy, a ceramic, or the like.

Thermal spray system 10 also includes energy source 26, which may be included in thermal spray gun 12 or may be separate from thermal spray gun 12. Energy source 26 provides energy to at least partially melt (e.g., partially melt or substantially fully melt) the coating material provided through material inlet port 28. In some examples, energy source 26 includes a plasma electrode, which may energize gas provided through gas feed line 20 to form a plasma. In other examples, energy source 26 includes an electrode that ignites gas provided through gas feed line 20.

As shown in FIG. 1, exit flowstream 30 exits outlet 32 of thermal spray gun 12. In some examples, outlet 32 includes a spray gun nozzle. Exit flowstream 30 may include at least partially melted coating material carried by a carrier gas. Outlet 32 may be configured and positioned to direct the at least partially melted coating material at spray target 18.

Thermal spray system 10 includes at least one acoustic sensor 14. In some examples, as shown in FIG. 1, thermal spray system 10 includes a plurality of acoustic sensors 14, such as at least two acoustic sensors 14. Each of the at least one acoustic sensor 14 is configured to sense acoustic signals 34 (e.g., sound). Acoustic signals 34 may be generated by one or more components or processes of thermal spray system 10. The at least one acoustic sensor 14 may include, for example, an acoustic sensing element such as a microphone or a sound-to-electric transducer or electromagnetic, capacitive, or piezoelectric elements that generate an electrical signal in response to incident sound waves.

The at least one acoustic sensor 14 may be configured to sense acoustic signals 34 with a predetermined wavelength or wavelength range. In some examples, the at least one acoustic sensor 14 may be configured to sense acoustic signals 34 that may or may not be detectable by human hearing, including infrasound and ultrasound. In some examples, acoustic signals 34 may include frequencies below about 20 Hz, from about 20 Hz to about 20 kHz, from about 20 kHz to about 2 MHz, higher than about 2 MHz, or combinations thereof.

Each acoustic sensor of the at least one acoustic sensor 14 is configured to generate a respective time-dependent acoustic data signal of at least one time-dependent acoustic data signal 36 based on the sensed acoustic signal 34 and communicate at least one time-dependent acoustic data signal 36 to computing device 16. In some examples, at least one time-dependent acoustic data signal 36 includes a digital data signal, and at least one acoustic sensor 14 includes an analog-to-digital converter. In other examples, at least one time-dependent acoustic data signal 36 may include an analog signal. In some examples, at least one acoustic sensor 14 may include an amplifier to amplify the signal sensed by at least one acoustic sensor 14 and produce the at least one time-dependent acoustic data signal 36. At least one acoustic sensor 14 may transmit at least one time-dependent acoustic data signal 36 to computing device 16 using electrical signals, Bluetooth, Wi-Fi, radio, or any other suitable transmission pathway.

Computing device 16 may be configured to control operation of one or more components of thermal spray system 10 automatically or under control of a user. For example, computing device 16 may be configured to control operation of thermal spray gun 12, gas feed line 20 (and the source of gas to gas feed line 20), material feed line 24 (and the source of material to material feed line 24), at least one acoustic sensor 14, and the like. Computing device 16 also may be configured to receive at least one time-dependent acoustic data signal 36 from at least one acoustic sensor 14 and analyze the at least one time-dependent acoustic data signal 36 to determine a control signal 17 to be sent to at least one system component of thermal spray system 10 for adjusting one or more process attributes of thermal spray system 10 based on the analysis.

During a thermal spray process, thermal spray system 10 performs at least one process, such as depositing a coating of spray material on spray target 18. Thermal spray system 10 and the thermal spray process performed by thermal spray system 10 are associated with a plurality of process attributes. The process attributes may include process parameters, component wear, and the like. Process parameters may deviate from designed or nominal values or ranges. Computing device 16 may be configured to compare the process deviations to the nominal or designed process parameters or process parameter ranges, for example, in real-time, or in near real-time during operation of thermal spray system 10. For example, process parameters may include at least one of a temperature, a pressure, a mass flow rate, a volumetric flow rate, a molecular flow rate, a molar flow rate, a composition, a velocity, or a concentration, of a flowstream flowing through thermal spray system 10, for instance, of gas flowing through gas feed line 20, or of exit flowstream 30, or of material flowing through material feed line 24. In some examples, the process deviations may include at least one of material feed fluctuation, for instance, powder pulsing, flow blockage (for e.g., of one or more of gas feed line 20, exit flowstream 30, material feed line 24), gas leakage, or a process deviation resulting from incompatibility (for e.g., wrong type or configuration of a component, for instance, using a nozzle that is unsuitable for a high viscosity flow) or wear of the at least one component. In some examples, wear of the at least one component may include wear of thermal spray gun 12, including wear of thermal spray outlet 32, wear of energy source 26, and wear of material inlet port 28, for instance, powder port wear.

As described above, system components of thermal spray system 10 and processes performed by thermal spray system 10 generate acoustic signals 34 during the thermal spray process. For example, acoustic signals 34 may originate from thermal spray gun 12 (e.g., energy source 26, thermal spray outlet 32, material inlet port 28, or gas inlet port 22), gas feed line 20, exit flowstream 30, material feed line 24, impact of the coating material against spray target 18, or any other component associated with thermal spray system 10, such as a coating material hopper, a coating material feeder, a gun or part manipulating robot or machine, an air handling system, a dust filtering system, or the like.

Acoustic signals 34 generated by the components depend on process attributes, and may change in response to process attributes changing. For example, acoustic signals 34 produced by gas feed line 20 may change in response to any one or more of the temperature, pressure, flowrate, viscosity, composition, or concentration of the flowstream in gas feed line 20 changing. Similarly, acoustic signals 34 produced by material feed line 20 may change in response to any one or more of the temperature, pressure, flowrate, viscosity, composition, or concentration of the carrier gas of the spray material in material feed line 24 changing. Acoustic signals 34 produced by exit flowstream 30 may change in response to, for example, any one or more of the temperature, pressure, flowrate, viscosity, composition, or concentration of exit flowstream 30 changing. Acoustic signals 34 produced by spray target 18 may change in response to any one or more of the temperature, pressure, flowrate, viscosity, composition, or concentration of the spray material impacting the spray target changing, or the composition, bulk or surface geometry of spray target 18 changing, or even in response to the thickness of the coating of spray material on spray target 18 changing. Acoustic signals 34 generated by gas feed port 22, material feed port 28, spray outlet 32 may change as the respective system component wears. In some examples, acoustic signals 34 generated by a worn spray outlet 32, for instance, a worn nozzle, differs from acoustic signals 34 generated by a new (e.g., previously unused) nozzle. A worn nozzle may produce a lower temperature plasma or a more turbulent plasma, that may decrease the temperature and velocity of spray material, producing a coating with lower hardness, increased porosity, and poor deposition efficiency. A worn or incorrect type of powder port may change the injection velocity of spray material, which may change the thermal profile encountered by spray material along a path to spray target 18. This may lead to an increased portion of unmelted spray material or a greater proportion of spray material passing through or bouncing off the plasma, affecting the coating properties. Leaks in a powder feed line may decrease injection velocity, similarly affecting the coating properties. Leaks in the plasma gas feed line may decrease the plasma temperature and velocity. Accidental or inadvertent incorrect setting or entry of typical input parameters may also affect a process attribute. Thus, a process attribute of the plurality of process attributes may be associated with at least one system component.

In some examples, respective process attributes may be associated with one or more respective frequency bands within acoustic signals 34. For example, a peak frequency in the tens of kilohertz (kHz; e.g., between about 13 kHz and about 15 kHz) may be associated with spray outlet 32, such as a spray nozzle, and may change as the spray outlet 32 mechanically wears. Other process attributes may similarly be associated with respective frequencies or frequency bands, which may change in frequency value, intensity, or the like, based on the value of the process attribute.

In some examples, acoustic signals 34 may be affected by the portion of the thermal spray process which is being performed. For example, acoustic signals 34 generated during an initial startup period by components of thermal spray system 10 may differ from acoustic signals 34 generated when thermal spray system 10 is performing a spraying process, or acoustic signals 34 generated when thermal spray system 10 is being shut down. Hence, computing device 16 may analyze at least one time-dependent acoustic data signal 36 to determine at which portion of the thermal spray process thermal spray system 10 is, or a user may identify the portion of the thermal spray process at which thermal spray system 10 is, and computing device 16 may utilize this information when analyzing at least one time-dependent acoustic data signal 36. In some examples, computing device 16 may identify the process stage at which thermal spray system 10 is operating by comparing a respective time-dependent acoustic data signal of at least one time-dependent acoustic data signal 36 of thermal spray system 10 in the unknown process stage to a time-dependent acoustic data signal from a known configuration or process stage of a thermal spray system.

Other factors may result in acoustic signals 34 changing. For example, acoustic signals 34 generated by components of thermal spray system 10 in a first configuration may differ from acoustic signals 34 generated in a second configuration. For example, the first configuration and the second configuration may differ in the spatial relationship between system components, or in the predetermined operating range of a process attribute. In some examples, computing device 16 may analyze a respective time-dependent acoustic data signal of at least one time-dependent acoustic data signal 36 to identify the configuration of components of thermal spray system 10.

In some examples, at least one acoustic sensor 14 may be configured to enhance detection of one or more acoustic signal of acoustic signals 34 compared to another one or more acoustic signal of acoustic signals 34. For instance, a first acoustic sensor of at least one acoustic sensor 14 may be positioned adjacent to a selected system component of thermal spray system 10, oriented toward a selected component of thermal spray system 10, or the like to enhance detection of a selected acoustic signal of acoustic signals 34 compared to another one or more acoustic signal of acoustic signals 34. For example, a first acoustic sensor of at least one acoustic sensor 14 may be positioned adjacent to thermal spray gun 12 to sense acoustic signals 34 originating from thermal spray gun 12 (e.g., material inlet port 28, gas inlet port 22, spray outlet 32), and a second acoustic sensor of at least one acoustic sensor 14 may be positioned adjacent to material feed line 24 to sense acoustic signals 34 originating from material feed line 24. The at least one acoustic sensor 14 may be located near a component or at a zone within the thermal spray system 10, or may be oriented towards a component to sense sound from the component, or otherwise more accurately attribute the sound to a source. In an example, at least one acoustic sensor 14 may include multiple acoustic sensors forming an acoustic sensor network that captures sound generated by various components of thermal spray system 10.

As described above, computing device 16 may control thermal spray system 10 by analyzing at least one time-dependent acoustic data signal 36 to determine information about one or more process attributes of thermal spray system 10, which may include, for example, a component configuration, component wear, process parameters, or process deviations of thermal spray system 10. For example, computing device 16 may be configured to receive the at least one time-dependent acoustic data signal 36, transform the at least one time-dependent acoustic data signal 36 to a frequency-domain spectrum, and determine a process attribute by identifying at least one characteristic of the frequency-domain spectrum. For example, the at least one characteristic may include a peak intensity or a peak frequency, and the magnitude of the peak intensity or the frequency band associated with the peak frequency may be associated with the process attribute. As described above, each of the plurality of process attributes of thermal spray system 10 may be associated with at least one respective frequency band.

In some examples, because of the different positions of at least one acoustic sensor 14, computing device 16 may analyze the at least time-dependent acoustic data signal 36 to determine information related to particular components of thermal spray system 10. For example, computing device 16 may utilize the intensity of respective frequency components of at least one time-dependent acoustic data signal 36 to determine a distance from the acoustic sensor from which the at least one time-dependent acoustic data signal 36 was received to the component generating the acoustic signal, and may attribute the acoustic signal to that component. Additionally or alternatively, computing device 16 may utilize data indicative of the position and/or orientation of the acoustic sensor from which the at least one time-dependent acoustic data signal 36 was received relative to a selected component to the acoustic signal to a component. In this way, computing device 16 may analyze the at least one time-dependent acoustic data signal 36 or multiple time-dependent acoustic data signals to determine process attributes for a plurality of components of the thermal spray system.

In some examples, computing device 16 may analyze at least one acoustic data signal 36 to identify process attributes, including process parameters, component wear, or both that may result in unsatisfactory coating characteristics or other undesirable conditions of thermal spray system 10. In some examples, computing device 16 may analyze at least one time-dependent acoustic data signal 36 to determine whether process attributes associated with the process performed by thermal spray system 10 are within a nominal or expected range, or if the process attributes are varying compared to or deviating from the nominal or expected range.

If the process attributes vary or deviate from the nominal or expected range, computing device 16 may control thermal spray system 10 to adjust the process attribute. In some examples, to control thermal spray system 10, computing device 16 may select at least one component of thermal spray system 10 based on the process attribute to be adjusted. For example, computing device 16 may determine at least one component to be operated at adjusted conditions to adjust the process attribute. In some examples, computing device 16 may compare a spectrum of acoustic data signal 36 with a baseline spectrum, and based on the comparison, may select a process attribute of a plurality of process attributes to be adjusted. Computing device 16 may adjust the process attribute by selecting at least one component of thermal spray system 10 based on the process attribute, and by sending control signal 17 to the selected at least one component. In some examples, computing device 16 may determine control signal 17 based on the comparison between the spectrum of acoustic data signal 36 with the baseline spectrum.

Computing device 16 may determine control signal 17 to be sent to the at least one component, such that control signal 17 would cause the at least one component to operate in an adjusted condition that would cause the process attribute to be adjusted, e.g., toward the nominal or expected range or value. Computing device 16 may store in a storage device theoretically derived or experimentally derived relationships between control signal 17 and the process attribute. For example, the relationship between control signal 17 and the process attribute may be represented in the form of equations, sets of equations, numerical approximations, look-up tables, or other suitable data structures. Thus, computing device 16 may determine control signal 17 based on a known relationship between, for example, a magnitude of control signal 17 and a magnitude of the process attribute. After determining control signal 17, computing device 16 may send control signal 17 to the at least one component to result in real-time or near real-time control of thermal spray system 10. For example, the at least one component may operate in an adjusted condition after receiving control signal 17 to cause the variation or deviation of the process attribute from the nominal or expected range to reduce, or substantially reduce to zero.

In some examples, by utilizing at least one time-dependent acoustic data signal 36, computing device 16 may perform real-time or near-real-time control of the operation of thermal spray system 10. By monitoring an actual output of the process, a better indication of deviation of the process attribute can be detected. Process control systems that rely on various electrical/mechanical subsystems such as flow meters, flow controllers, amp meters, and voltmeters can be inaccurate or out of calibration, and are generally upstream of the actual spraying process. For example, monitoring powder flow to thermal spray guns by monitoring pressure, carrier gas flow rate and mechanical feeder component rates of motion don't provide indication of downstream phenomenon such as powder pulsing, flow blockage, component wear, or gas leakage. These changes affect the powder trajectory upon injection and can significantly change the thermal profile powder experiences and thus change the resultant particle temperature, velocity, and coating properties. Thus, monitoring a signal representative of one or more outputs of thermal spray system 10 may provide a more accurate indication of process attributes of thermal spray system 10, e.g., compared to monitoring inputs to thermal spray system 10 using a flow meter, flow controller, amp meter, or voltmeter. Further, in some examples, flow meters, flow controllers, amp meters, and voltmeters may require calibration, and falling out of calibration may reduce the accuracy of the feedback provided by out-of-calibration flow meters, flow controllers, amp meters, and voltmeters.

Figure 2:
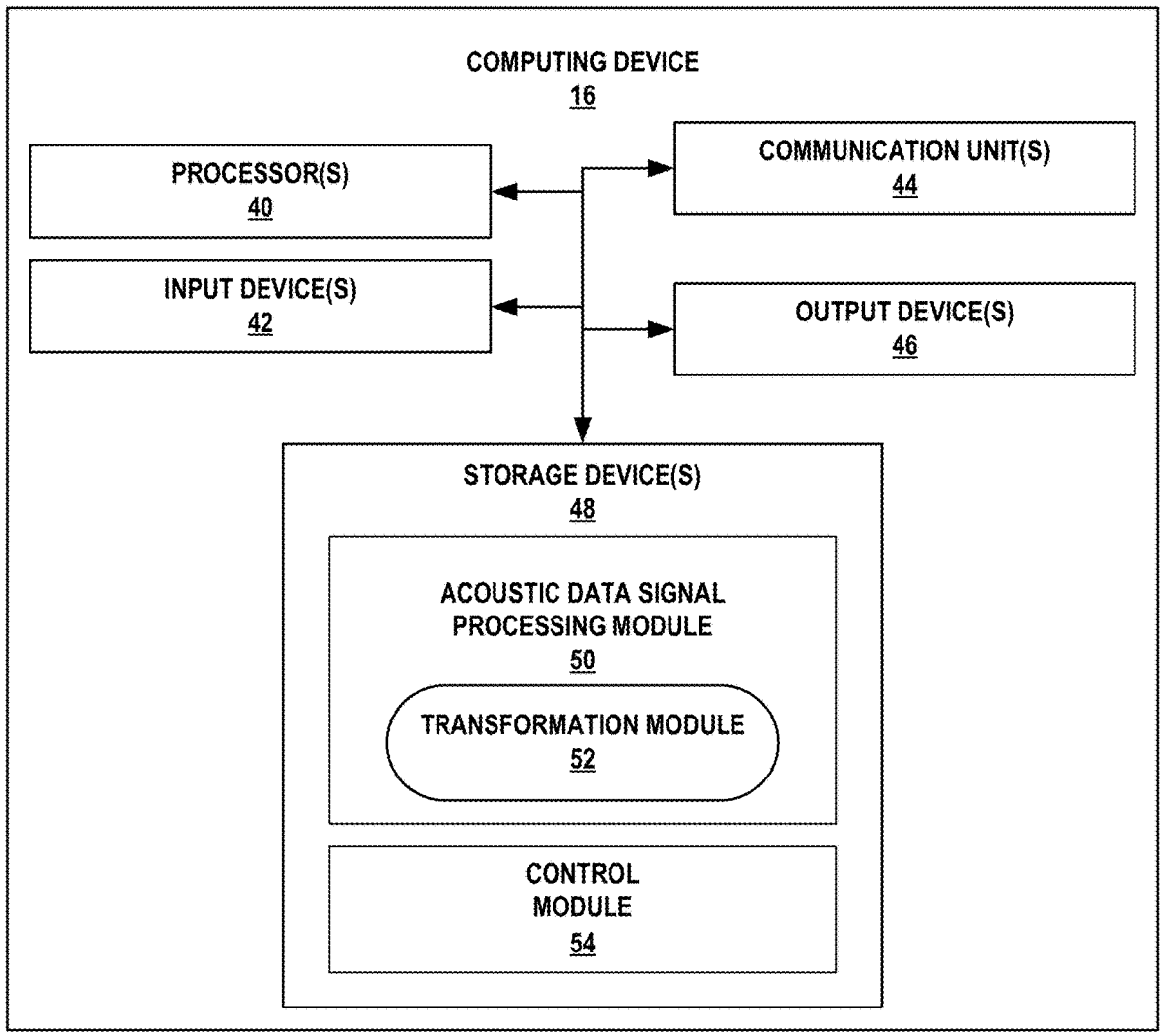
FIG. 2 is a conceptual block diagram illustrating an example of a computing device for controlling a process performed by a thermal spray system by adjusting a process attribute in response to an acoustic signal generated by the thermal spray system.

FIG. 2 is a conceptual block diagram illustrating an example of computing device 16 illustrated in FIG. 1. In some examples, computing device 16 may include, for example, a desktop computer, a laptop computer, a workstation, a server, a mainframe, a cloud computing system, or the like. In some examples, computing device 16 controls the operation of system 10, including, for example, thermal spray gun 12, energy source 26, gas feed line 20, exit flowstream 30, acoustic sensors 14, material feed line 24, and spray target 18.

In the example illustrated in FIG. 2, computing device 16 includes one or more processors 40, one or more input devices 42, one or more communication units 44, one or more output devices 46, and one or more storage devices 48. In some examples, one or more storage devices 48 stores acoustic data signal processing module 50, transformation module 52, and control module 54. In other examples, computing device 16 may include additional components or fewer components than those illustrated in FIG. 2.

One or more processors 40 are configured to implement functionality and/or process instructions for execution within computing device 16. For example, processors 40 may be capable of processing instructions stored by storage device 48. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 16 during operation. Storage devices 48, in some examples, include a computer-readable storage medium or computer-readable storage device. In some examples, storage devices 48 include a temporary memory, meaning that a primary purpose of storage device 48 is not long-term storage. Storage devices 48, in some examples, include a volatile memory, meaning that storage device 48 does not maintain stored contents when power is not provided to storage device 48. Examples of volatile memories include random access memories (RAM), dynamic random access memories (DRAM), static random access memories (SRAM), and other forms of volatile memories known in the art. In some examples, storage devices 48 are used to store program instructions for execution by processors 40. Storage devices 48, in some examples, are used by software or applications running on computing device 16 to temporarily store information during program execution.

In some examples, storage devices 48 may further include one or more storage device 48 configured for longer-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 16 further includes one or more communication units 44. Computing device 16 may utilize communication units 44 to communicate with external devices (e.g., thermal spray gun 12, entry flowstream 130, exit flowstream 30, acoustic sensor 14, spray material 150, and spray target 18) via one or more networks, such as one or more wired or wireless networks. Communication unit 44 may include a network interface card, such as an Ethernet card, an optical transceiver, a radio frequency transceiver, or any other type of device that can send and receive information. Other examples of such network interfaces may include WiFi radios or Universal Serial Bus (USB). In some examples, computing device 16 utilizes communication units 44 to wirelessly communicate with an external device such as a server.

Computing device 16 also includes one or more input devices 42. Input devices 42, in some examples, are configured to receive input from a user through tactile, audio, or video sources. Examples of input devices 42 include a mouse, a keyboard, a voice responsive system, video camera, microphone, touchscreen, or any other type of device for detecting a command from a user.

Computing device 16 may further include one or more output devices 46. Output devices 46, in some examples, are configured to provide output to a user using audio or video media. For example, output devices 46 may include a display, a sound card, a video graphics adapter card, or any other type of device for converting a signal into an appropriate form understandable to humans or machines. In some example, computing device 16 outputs a representation of one or more of the at least one time-dependent acoustic data signal 36, of the frequency-domain spectrum, of the at least one characteristic of the frequency-domain spectrum, or of the process attribute that the at least one characteristic is indicative of, via output devices 46. In some examples, computing device 16 outputs a representation of control signal 17 via output devices 46.

In some examples, computing device 16 may determine control signal 17 or generate an alert in response to the least one process attribute, via output devices 46. For example, computing device 16 may generate auditory signals, such as a beep, an alert tone, or an alerting sound, or visual signals, such as an icon on a display, flashing lights, or a combination of visual and audible signals, to indicate a process attribute variance or a process attribute deviation. In some examples, an operator may thus be alerted, and may choose to investigate thermal spray system 10. As another example, computing device 16 may generate an alert that is transmitted over a network to another computing device, including a hand-held computing device, for instance, a cellphone. The alert signal may include information about the process attribute, for instance, a process parameter, or a variance in the process parameter, or a process deviation status, or an identification of the process deviation. In some examples, computing device 16 may determine control signal 17 and send control signal 17 to at least one component to control thermal spray system 10 by adjusting the process attribute, for example, to reduce a variance or deviation of the process attribute from a normal or expected range.

Computing device 16 also may include an acoustic data signal processing module 50 and a control module 54. In some examples, acoustic data signal processing module 50 pre-processes or processes at least one time-dependent acoustic data signal 36 to prepare at least one time-dependent acoustic data signal 36 for analysis by control module 54, and control module 54 analyzes at least one time-dependent acoustic data signal 36 to determine the process attribute. In some examples, acoustic data signal processing module 50 may include a transformation module 52 for transforming at least one time-dependent acoustic data signal 36 from a time-domain spectrum to a frequency-domain spectrum. Functions performed by acoustic data signal processing module 50, transformation module 52 and control module 54 are explained below with reference to the example flow diagram illustrated in FIG. 3.

Acoustic data signal processing module 50, transformation module 52, and control module 54 may be implemented in various ways. For example, acoustic data signal processing module 50, transformation module 52, and/or control module 54 may be implemented as software, such as an executable application or an operating system, or firmware executed by one or more processors 40. In other examples, acoustic data signal processing module 50, transformation module 52, and/or control module 54 may be implemented as part of a hardware unit of computing device 16. In some examples, acoustic data signal processing module 50 includes transformation module 52, as shown in FIG. 2. In some examples, transformation module 52 is separate from acoustic data signal processing module 50.

Computing device 16 may include additional components that, for clarity, are not shown in FIG. 2. For example, computing device 16 may include a power supply to provide power to the components of computing device 16. Similarly, the components of computing device 16 shown in FIG. 2 may not be necessary in every example of computing device 16.

Examples of thermal spray system 10 and computing device 16 are described with reference to FIGS. 1 and 2 above, including examples of at least one acoustic sensor 14 for generating at least one time-dependent acoustic data signal 36 indicative of acoustic signals 34 generated by thermal spray system 10. Example techniques for analyzing at least one time-dependent data signals to determine a process attribute of a process performed by thermal spray system 10 are described with reference to FIG. 3.

Figure 3:
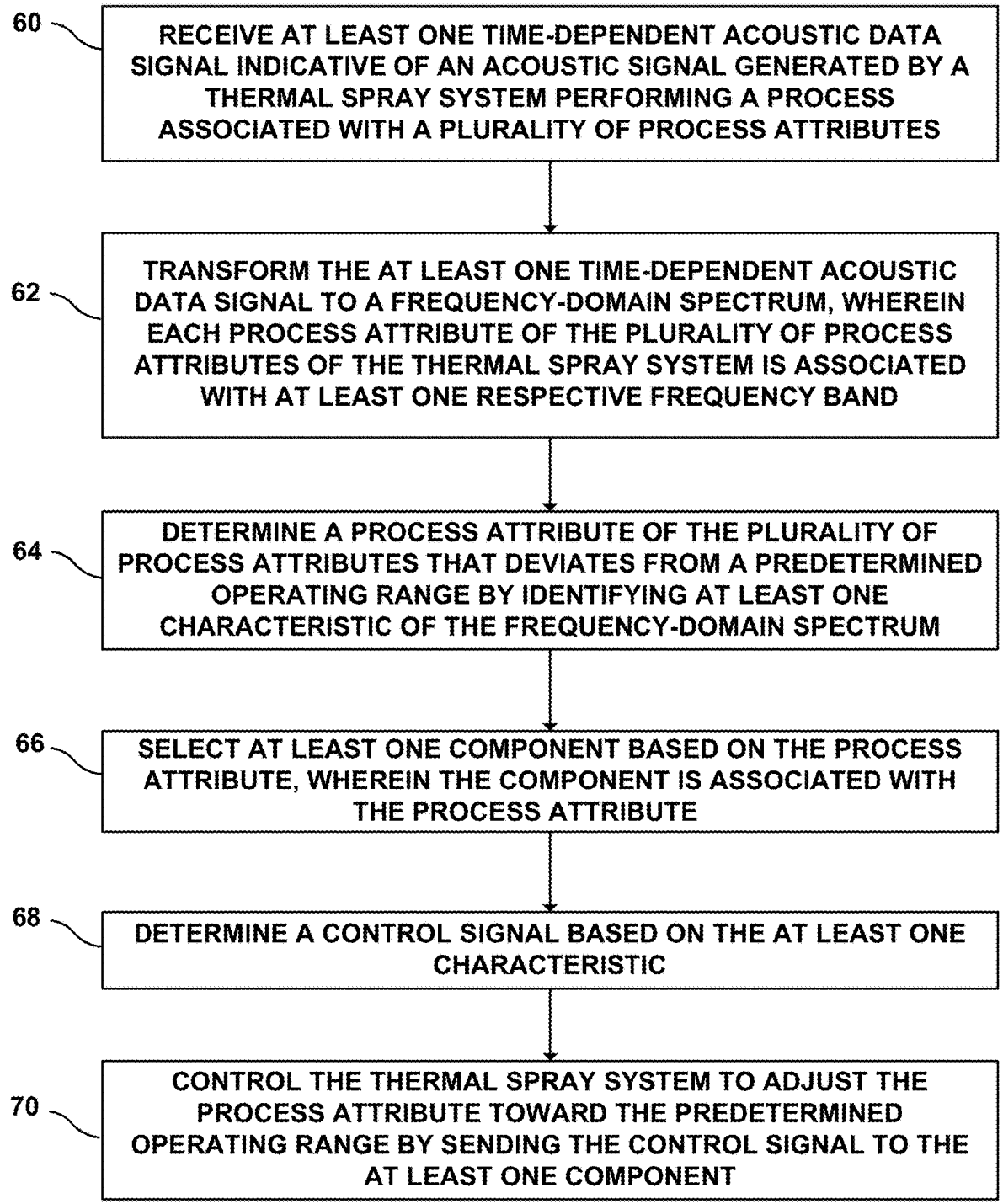
FIG. 3 is a flow diagram illustrating an example technique for controlling a process performed by a thermal spray system by adjusting a process attribute in response to an acoustic signal generated by the thermal spray system.

FIG. 3 is a flow diagram illustrating an example technique for analyzing an acoustic signal generated by a thermal spray system performing a process associated with a plurality of process attributes to determine a process attribute of the plurality of process attributes. In some examples, a computing device, such as computing device 16, may implement the technique of FIG. 3 to analyze the at least one time-dependent acoustic data signal 36 indicative of acoustic signals 34 generated by thermal spray system 10 performing a process associated with a plurality of process attributes, described in various examples with reference to FIG. 1 above, to determine a process attribute of the plurality of process attributes. The technique of FIG. 3 will be described with reference to thermal spray system 10 of FIG. 1, and computing device 16 of FIGS. 1 and 2, for purposes of description only. It will be appreciated that the technique of FIG. 3 may be used to analyze at least one acoustic data signal to determine a process attribute of processes performed by other thermal spray systems, that other computing devices may implement the technique of FIG. 3, or both.

The technique of FIG. 3 includes receiving, by computing device 16, from at least one acoustic sensor 14, at least one time-dependent acoustic data signal 36 indicative of acoustic signals 34 generated by thermal spray system 10 (60). In some examples, at least one time-dependent acoustic data signal 36 may include analog signals, and acoustic data signal processing module 50 of computing device 16 may process at least one acoustic data signal 36 by performing an analog-to-digital conversion. In other examples, the received at least one time-dependent acoustic data signal 36 may include digital signals and acoustic data signal processing module 50 may not perform analog-to-digital conversion of at least one time-dependent acoustic data signal 36. In some examples, acoustic data signal processing module 50 of computing device 16 may filter at least one acoustic data signal 36 through signal processing filters such as band pass filters, high pass filters, low pass filters, comb filters, notch filters, or other filters, for instance, deconvolution filters, or noise filters to filter out undesirable signal components, such as noise, superfluous signal components, such as harmonics, or to reduce or compress the information in at least one acoustic data signal 36.

The technique of FIG. 3 also includes transforming, by transformation module 52 of computing device 16, at least one time-dependent acoustic data signal 36 to a frequency-domain spectrum (62). The frequency-domain spectrum may include intensity or amplitude as a function of frequency. In some examples, transformation module 52 of computing device 16 transforms at least one time-dependent acoustic data signal 36 to a frequency-domain spectrum using at least one of a fast Fourier transform or a discrete Fourier transform. In some examples, transformation module 52 may perform the transformation before, during or after other processing such as filtering described above.

The technique of FIG. 3 further includes determining, by control module 54 of computing device 16, a process attribute of the plurality of process attributes by identifying at least one characteristic of the frequency-domain spectrum (64). As described above, in some examples, each process attribute of the plurality of process attributes is associated with at least one respective frequency band in the frequency-domain spectrum. For example, nozzle wear of thermal spray gun 12 may be associated with a first frequency band, and gas flow through gas feed line 20 may be associated with a second frequency band. Other examples are also contemplated, for example, those described with respect to FIG. 1. Therefore, control module 54 may determine the process attribute based at least in part on the identified at least characteristic of the frequency-domain spectrum according to one or more example techniques described below.

Computing device 16 may identify at least one characteristic of the frequency-domain spectrum using one or more of the example techniques described below. In some examples, control module 54 may analyze the entire frequency-domain spectrum to identify at least one characteristic of the frequency-domain spectrum (64). For example, control module 54 may compare the entire frequency-domain spectrum with a second frequency-domain spectrum to identify at least one characteristic of the frequency-domain spectrum (64). In some examples, the second frequency-domain spectrum may be a known or reference frequency-domain spectrum, such as sample frequency-domain spectrum obtained from another known thermal spray system performing a known thermal spray process or a calculated frequency-domain spectrum. In this way, control module 54 may compare the entire frequency-domain spectrum to a frequency-domain spectrum representative of expected operation of thermal spray system 10.

In other examples, the second frequency-domain spectrum may be a past frequency-domain spectrum obtained from at least one time-dependent acoustic data signal 36 over a past interval of time from thermal spray system 10. The second frequency-domain spectrum may include, for example, a past frequency-domain spectrum obtained during the process, so that control module 54 compares the frequency-domain spectrum at a present interval of time with the frequency-domain spectrum at a past interval of time to identify the at least one characteristic. In this way, control module 54 may identify changes of the frequency-domain spectrum relative to past operation of thermal spray system 10 and may determine changes over time of operation of thermal spray system 10.

In some examples, control module 54 may then determine the process attribute by at least selecting at least one of a representative frequency or a representative intensity of the frequency within the frequency-domain spectrum as the at least one characteristic based on the comparison of the entire frequency-domain spectrum with the known frequency-domain spectrum (64). For example, control module 54 may identify at least one frequency for which an intensity has changed between the second frequency-domain spectrum and the frequency-domain spectrum determined based on at least one time-dependent acoustic data signal 36, and may select that frequency as the process attribute or for use in determining the process attribute. In some examples, control module 54 may identify a plurality of respective frequencies for which a respective intensity has changed between the second frequency-domain spectrum and the frequency-domain spectrum determined based on at least one time-dependent acoustic data signal 36, and may select each respective frequency as a process attribute or for use in determining a respective process attribute. In some examples, control module 54 may determine the process attribute by at least one of comparing the at least one characteristic at a first interval of time with the at least one characteristic at a second interval of time to determine a difference, comparing the at least one characteristic at a third interval of time with a predetermined characteristic value range to determine the difference, or comparing the at least one characteristic at a fourth interval of time with a respective known characteristic of a known frequency-domain spectrum to determine the difference, and based on the difference, identifying the deviation of the process attribute from the predetermined operating range. In this way, in some examples, control module 54 may determine a plurality of process attributes for thermal spray system 10 based at least in part on at least one time-dependent acoustic data signal 36.

In other examples, instead of analyzing the entire frequency-domain spectrum, control module 54 may analyze a selected portion of the frequency-domain spectrum to identify at least one characteristic of the frequency-domain spectrum (64). For example, identifying at least one characteristic of the frequency-domain spectrum (64) may include filtering, by acoustic data signal processing module 50, the at least one time-dependent acoustic data signal 36 to select a frequency band prior to transforming, by transformation module 52, at least one time-dependent acoustic data signal 36 to the frequency-domain spectrum (62), or selecting, by acoustic data signal processing module 50, a frequency band from the frequency-domain spectrum. In some examples, identifying the at least one characteristic of the frequency-domain spectrum (64) may further include analyzing, by control module 54, the selected frequency band to identify at least one characteristic of the frequency-domain spectrum (64). In some examples, control module 54 may compare the selected frequency band with a second frequency band, which may be analogous to the second frequency-domain spectrum described above. For example, the second frequency band may be a known or reference frequency-domain spectrum or may be a past frequency-domain spectrum obtained from at least one time-dependent acoustic data signal 36.

In some examples, determining the process attribute may include selecting, by control module 54, at least one of a frequency or an intensity of the frequency within the selected frequency band as the at least one characteristic based on the comparison of the selected frequency band with the known frequency band (64). For example, control module 54 may extract a plurality of intensities from a selected frequency band of the frequency-domain spectrum, each intensity of the plurality of intensities corresponding to a respective frequency of a plurality of frequencies within the selected frequency band. In some examples, control module 54 may select at least one of an intensity of the plurality of intensities or the respective frequency of the plurality of frequencies as the at least one characteristic. In some examples, control module 54 may identify the maximum intensity of the plurality of intensities and select at least one of the maximum intensity (for instance, peal intensity) or the frequency associated with the maximum intensity (for instance, peak frequency) as the at least one characteristic.

In some examples, after determining the at least one characteristic of the frequency-domain spectrum, control module 54 may compare the at least one characteristic with a characteristic value or range of characteristic values to determine the process attribute (64). The at least one characteristic and the known or expected characteristic value or range of characteristic values may relate to aspects of process attributes (e.g., magnitude, variation, or the like), which may be associated with frequency values within a frequency band, may be associated with intensities of one or more frequencies within a frequency band, or both. For example, the magnitude of a process attribute may be related to the magnitude of intensities of at least one frequency within the respective frequency band associated with the process attribute, and changes in the process attribute may result in changes in the respective frequency band associated with the process attribute. In some of these examples, increases or decreases in the magnitude of a process attribute may result in corresponding increases or decreases in intensities of one or more frequencies within the respective frequency band associated with the process attribute. Alternatively, or additionally, the occurrence of a phenomenon within thermal spray system may result in a change in the peak frequency, peak intensity, or both, exhibited by the respective frequency band associated with the process attribute responsible for the occurrence of the phenomenon. Therefore, control module 54 may compare the compare the at least one characteristic with a known or expected characteristic value or range of characteristic values to determine the process attribute.

Control module 54 may compare the at least one characteristic with a known or expected characteristic value or range of characteristic values to determine the process attribute using one or more of the following example techniques. In some examples, control module 54 may select the known or expected characteristic value or range of characteristic values from a second frequency-domain spectrum, such as a known frequency-domain spectrum obtained from a test or experimental process or a frequency-domain spectrum from a past time interval of the present process. In some examples, the known frequency-domain spectrum may include a frequency-domain spectrum obtained from a thermal spray process that resulted in satisfactory coating characteristics. In other examples, the known frequency-domain spectrum may be a reference frequency-domain spectrum that includes expected or nominal frequency content based on expected or nominal process attributes. Thus, comparing the at least one characteristic with known or expected characteristic value or range of characteristic values may allow control module 54 to determine the deviation or variation of a process attribute of the present process from the process attribute of a known process.

Comparing the at least one characteristic with a characteristic value or range of characteristic values obtained from the frequency-domain spectrum over a past time interval (64) may allow control module 54 to determine the change in the process attribute from the past time interval to the present time interval. In some examples, control module 54 may determine an increase or decrease in the intensity of a frequency in a selected frequency band compared to an intensity in the past frequency-domain spectrum as indicative of a respective increase or decrease in the magnitude of a process attribute associated with the selected frequency band.

In some examples, control module 54 identifies the at least one characteristic at a first interval of time, and compares it with a known characteristic value that is a value of the at least one characteristic at a second interval of time. In some examples, the first interval of time may be a present or recent interval of time, and the second interval of time may be a past interval of time. In some examples, the first interval of time may be associated with a known system performance, for instance, a known magnitude of a process attribute, and the second interval of time may be associated with an unknown system performance, for instance, an unknown magnitude of a process attribute. In some examples, control module 54 identifies the at least one characteristic at the first interval of time, and compares the at least one characteristic with a known or predetermined characteristic value or known or predetermined characteristic value range. In some examples, the at least one characteristic at the first interval of time includes at least one of an average intensity of the frequency-domain spectrum, a peak intensity of the frequency-domain spectrum, a selected frequency of the frequency-domain spectrum, or a frequency associated with a peak intensity of the frequency-domain spectrum and the predetermined characteristic value range includes a range of the corresponding characteristic.

In some examples, the process attribute may include nozzle wear, the at least one characteristic includes a peak frequency, and the predetermined characteristic value range includes a range of frequencies from about 13 kHz to about 15 kHz. In other examples, the process attribute includes nozzle wear, the at least one characteristic includes a peak intensity, and the known intensity value is about 30 dB and is associated with nozzle wear. In other examples, the process attribute includes nozzle wear, the at least one characteristic includes a peak frequency, and the known frequency value is about 4.76 kHz and associated with nozzle wear. In some examples, the process attribute includes powder pulsing, the at least one characteristic includes a peak frequency within a frequency band of 4 to 7.5 kHz, and the characteristic value range of frequencies greater than about 4.8 kHz is associated with powder pulsing. In some examples, the process attribute includes powder pulsing, the at least one characteristic includes a peak frequency within a frequency band of 7.5 to 15 kHz, and the characteristic value range of frequencies greater than about 9.6 kHz is associated with powder pulsing.

In these ways, control module 54 may determine at least one process attribute of the plurality of process attributes. In some examples, thermal spray system 10 may perform a process associated with a plurality of process attributes. In some examples, identifying the magnitude of a process attribute may be desirable. Control module 54 may determine the process attribute, for instance, a process parameter that may include at least one of a temperature, a pressure, a mass flow rate, a volumetric flow rate, a molecular flow rate, a molar flow rate, a composition or a concentration, of a flowstream flowing through thermal spray system 10, for instance, of gas flowing through gas feed line 20, or of exit flowstream 30, or of material flowing through material feed line 24 based at least in part on at least one time-dependent acoustic signal 36.

In some examples, thermal spray system 10 may exhibit unsatisfactory performance for an unknown reason that may be related to a process deviation. For example, a process attribute may deviate from a predetermined operating range. Computing device 16 may analyze at least one time-dependent acoustic data signal 36 by one or more example techniques described above with reference to FIG. 3 to determine the process deviation. In some examples, the process deviation may include at least one of material feed fluctuation, for instance, powder pulsing; flow blockage (for e.g., of one or more of gas feed line 20, exit flowstream 30, material feed line 24); gas leakage; a process deviation resulting from incompatibility (for e.g., wrong type or configuration of a component, for instance, using a nozzle that is unsuitable for a high viscosity flow); or wear of the at least one component, which may include at least one of wear of thermal spray gun 12, including wear of thermal spray outlet 32, wear of energy source 26, or wear of material inlet port 28.

The example technique of FIG. 3 includes selecting, by control module 54 of computing device 16, at least one component of system 10 based on the process attribute (66). For example, control module 54 may select one or more components that affect the process attribute, to control the one or more components to control the process attribute. For example, the process attribute may include a flow rate of a carrier gas, and the selected at least one component may include a flow valve. Thus, if the flow rate deviates from a nominal flow rate, control module 54 may select the flow valve to be controlled to control the flow rate of the carrier gas. For example, if the flow rate is higher than the nominal flow rate, control module 54 may select the flow valve to be controlled to restrict the flow to reduce the flow rate to the nominal flow rate.

In some examples, if the process attribute is indicative of pulsing, control module 54 may select the flow valve for control, for example, to increase the carrier gas flow rate to alleviate pulsing. In some examples, if the process attribute is indicative of electrode wear, control module 54 may select a hydrogen flow valve for control, for example, to increase the hydrogen flow rate to compensate for the electrode wear. In some examples, if the process attribute is indicative of material feeder wear, or a temperature reduction indicative of feeder wear, control module 54 may select a carrier gas (for example, argon) flow valve for control, for example, to increase the carrier gas flow rate to ensure that powder flows at a sufficiently high rate to contact the hottest zone of the plasma. In some examples, more than one component may affect a process attribute. For example, if the process attribute is indicative of nozzle wear, control module 54 may select one or both of a component that applies an operating electric current to the nozzle, or a component that controls the secondary plasma gas flow rate. Control module 54 may control one or both of the components to cause one or both of the current to be increased or the secondary plasma gas flow rate to increase to compensate for the nozzle wear.

Control module 54 of computing device 16 may control thermal spray system 10, for example, by controlling the selected at least one component of thermal spray system 10. In some examples, control module 54 may determine a control signal 17 to be sent to the selected at least one component based on the at least one characteristic of the frequency-domain spectrum of time-dependent acoustic data signal 36 (68). For example, the at least one characteristic may indicate that the process attribute is to be increased, and control module 54 may determine a control signal that may cause the selected at least one component to increase the process attribute. Alternatively, the at least one characteristic may indicate that the process attribute is to be decreased, and control module 54 may determine a control signal that may cause the selected at least one component to decrease the process attribute. In some examples, the at least one characteristic may indicate that the operation of the selected at least one component or thermal spray system 10 should be paused or shut down. For example, the at least one characteristic may indicate a severely worn nozzle in need of replacement. Thus, in some examples, control module 54 may determine a control signal that may cause the selected at least one component, or even thermal spray system 10 as a whole, to at least temporarily shut down, allowing for the selected at least one component or another component to be replaced. For example, control module 54 may determine a control signal 17 that causes component applying an electric current to an electrode to stop, so that a worn nozzle may safely be replaced with a replacement nozzle. In some examples, control module 54 may determine the control signal by at least one of at least one of comparing the at least one characteristic at a first interval of time with the at least one characteristic at a second interval of time to determine a difference, comparing the at least one characteristic at a third interval of time with a predetermined characteristic value range to determine the difference, or comparing the at least one characteristic at a fourth interval of time with a respective known characteristic of a known frequency-domain spectrum to determine the difference, and based on the difference, determining the control signal configured to reduce the difference to restore the process attribute toward the predetermined operating range. For example, the carrier gas flow rate may be increased to alleviate pulsing, current or secondary plasma gas may be increased to account for nozzle wear, or the thermal process may be interrupted or halted in case of signals beyond normal or well beyond predetermined operating ranges, to allow operator inspection or additional process analysis before the process is resumed.

Computing device 16 may collect and process acoustic data signal 36 through the use of a FFT (Fast Fourier Transform) to extract frequency information (for example, a spectrum indicative of peak frequencies and intensities). At least one characteristic of the spectrum may be used to as a "fingerprint," for example, to query a database or other library directly or implement a communication protocol, if necessary, to continually process acoustic data signal 36 and statistically fit it to the nearest possible match from a database or a look-up table.

After determining a control signal for the selected at least one component, or respective control signals for respective more than one components of the selected at least component, control module 54 may control thermal spray system 10 to adjust the process attribute toward the predetermined operating range by sending the control signal to the at least one component (70). For example, control module 54 may send an operating signal via a wired connection, a communications bus, or a wireless connection to the at least one component. In response to receiving the control signal from control module 54, the at least one component may change its operation to result in an adjustment of the process attribute.

While control module 54 may separately perform determining the process attribute (64) selecting the at least one component (66), determining the control signal (68), and sending the control signal to the at least one component (70), as described with reference to the example technique of FIG. 3, in other examples, control module 54 may combine one or more of determining the process attribute (64) selecting the at least one component (66), determining the control signal (68), and sending the control signal to the at least one component (70) into one or more steps. For example, control module 54 may determine a control signal based on the at least one characteristic (68) as part of determining the process attribute (64). In some examples, control module 54 may continuously, or at near-continuous intervals of time, compare the frequency-domain spectrum of time-dependent acoustic data signal 36 with a reference frequency-domain spectrum, and provide the result of the comparison as feedback to an operator by outputting a display of numeric differences, charts, graphs, alarms, warnings, or the like, or to a process controller for automatic adjustments to operating parameters of thermal spray system 10 or immediate shut down of thermal spray system 10. In some examples, a onset of a signal associated with a powder feed line above a preprocess baseline may indicate start of powder flow, discontinuities in intensity or a low frequency peak in the Fast Fourier Transform (FFT) of this signal may indicate pulsing, blockage, or some other disruption to powder flow. In response, control module 54 may send a control signal to a component that controls flow rate of powder through the powder feed line.

In this way, computing device 16 may perform the examples techniques described above with reference to FIG. 3 to analyze at least one time-dependent acoustic data signal 36 to determine process attributes for a plurality of components of thermal spray system 10 performing a process, and determine whether process attributes are within a nominal or expected range, or if the process attributes are varying compared to an expected value. Based on the analysis, computing device 16 may control thermal spray system 10, for example, by selecting one or more components of thermal spray system 10, and sending one or more respective control signals to control the respective components to adjust the process attribute. In some examples, an operator may control thermal spray system 10 based on a component control strategy determined by computing device 16. For example, computing device 16 may determine one or more components of thermal spray system 10 as being responsible for a deviation in the process attribute, and identify the components by generating an output detectable by an operator. In response, the operator may control the components to restore the process attribute to the nominal operating range. In some examples, operator intervention may not be required, and computing device 16 may perform the analysis and control in real-time or near real-time, for example, within minutes, seconds, or fractions of seconds after determining the process attribute, to adjust the attribute by controlling thermal spray system 10 in real-time or near real-time.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

EXAMPLES

Example 1

Figure 4:
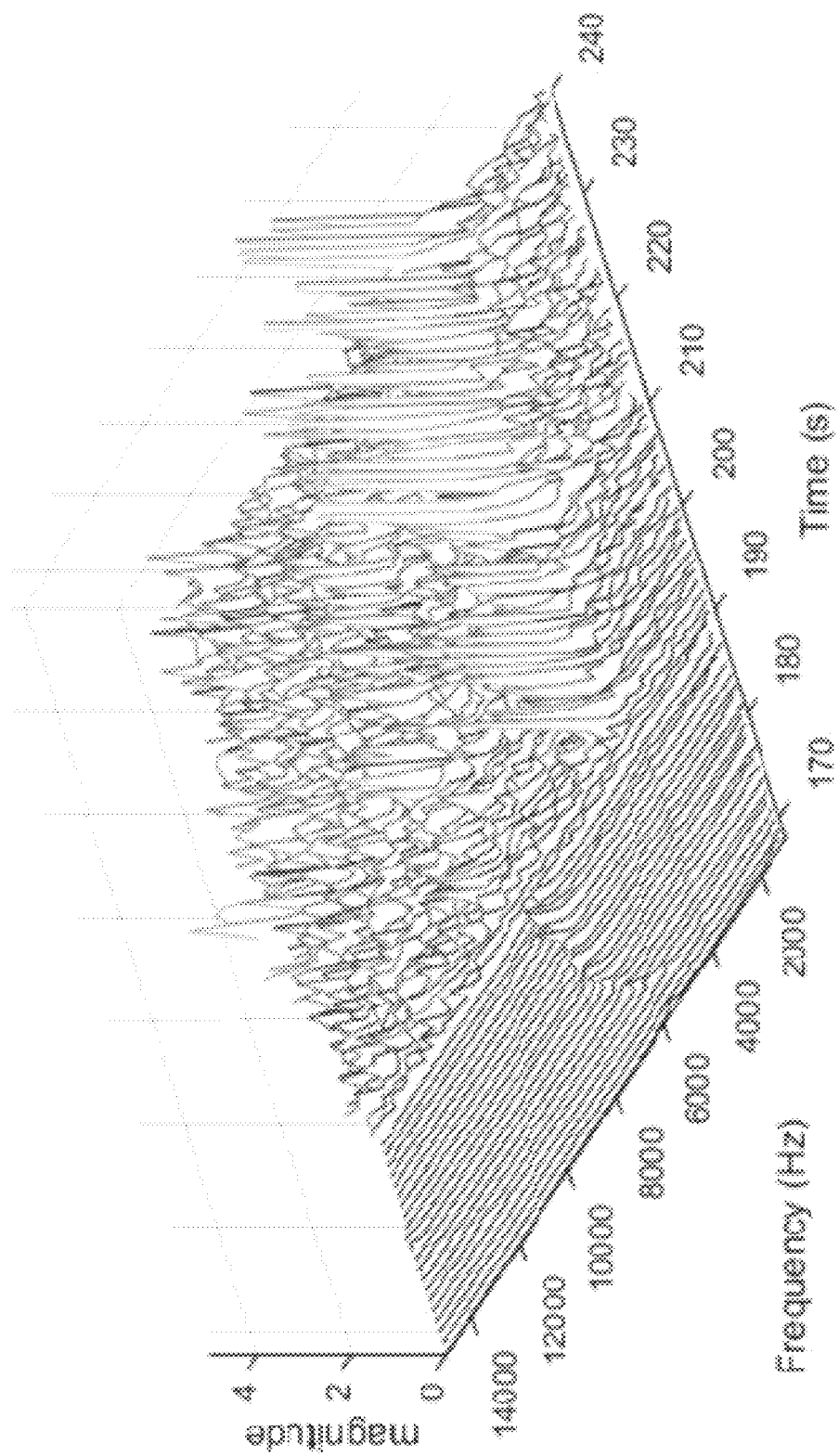
FIG. 4 is a chart presenting pre-ignition, ignition, and steady state spectra of an acoustic signal of a thermal spray system as a function of time.

The time dependence of a thermal spray process acoustic signal through ignition of a thermal spray gun was evaluated. The nozzle used was type GP in a 9 MB plasma spray gun progressing from and off-state to operating conditions of 90 NLPM argon, 7.5 NLPM hydrogen, and 400 A current. Acoustic signals associated with a thermal spray system including a thermal spray gun were recorded pre-ignition, during ramp-up, and through steady state. A frequency spectrum was obtained from the acoustic signals at periodic intervals of time. The results are illustrated in FIG. 4. FIG. 4 is a chart presenting pre-ignition, ignition, and steady state spectra of the acoustic signal of the thermal spray system as a function of time. As seen in FIG. 4, different baseline spectra are associated with pre-ignition (<190 s), ramp up (190-210 s), and steady state (>210 s).

Example 2

Figure 5:
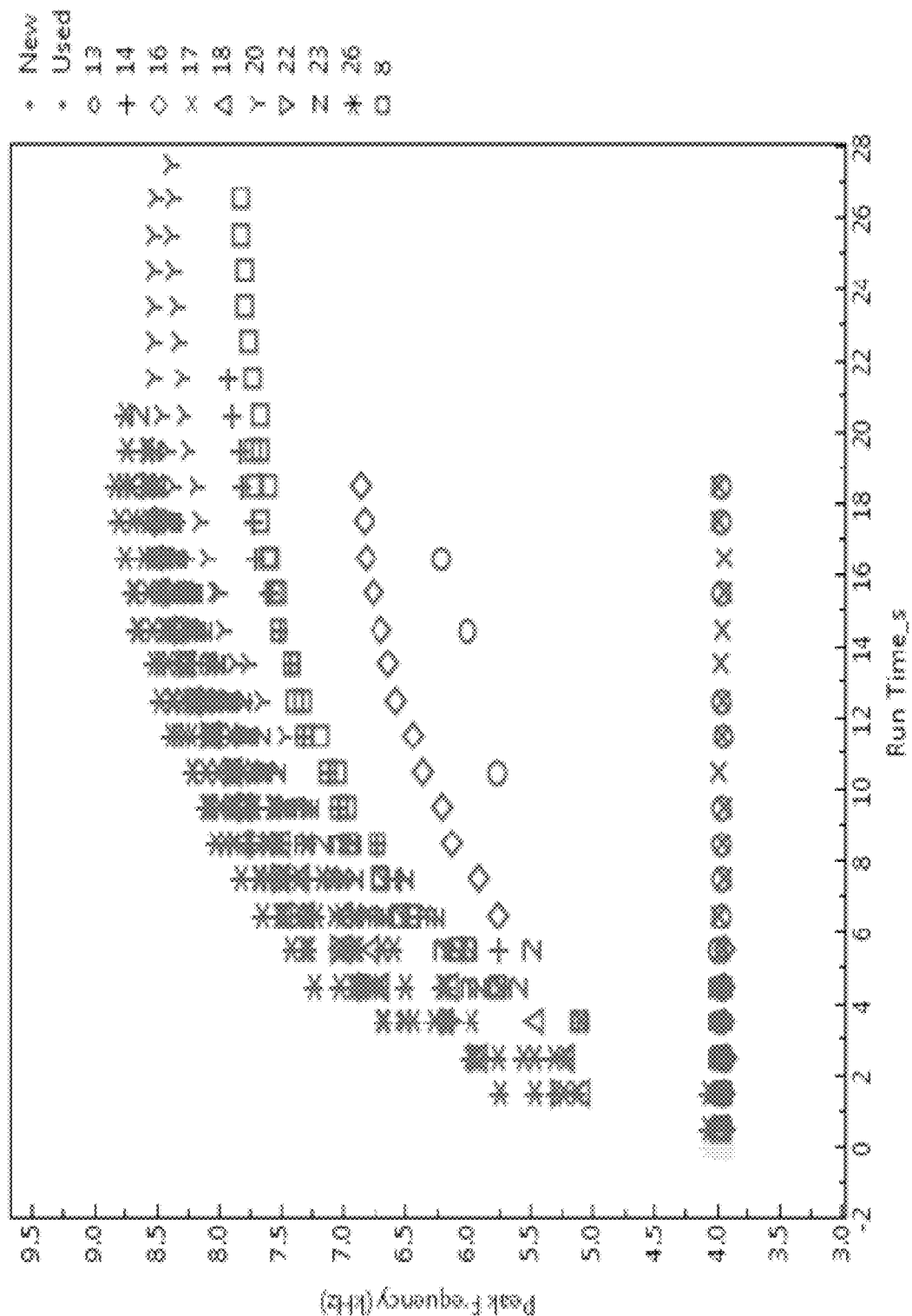
FIG. 5 is a chart presenting an example observed relationship between pre-ignition peak frequencies and run time for example plasma gun starts.

The relation between nozzle type and condition and pre-ignition peak frequency was evaluated. Acoustic signals associated with about 20 gun start runs for different plasma spray guns were monitored, and peak frequencies were determined as a function of time. FIG. 5 is a chart presenting an example observed relationship between pre-ignition peak frequencies and run time for the example plasma gun starts. The peak frequency changed with time from argon start to actual ignition (18 to 28 seconds after the argon start). Pre-ignition peak frequencies of lower than 8 kHz immediately prior to (1 to 2 seconds prior to) ignition indicated a need for nozzle replacement or adjustment of coating parameters.

Example 3

Six plasma spray nozzles of similar type to those used above in Example 1 were subjected to about 15 minutes of heavy use. A heavy use constituted spray parameters (current and gas flow rates) at the high end of what nozzles are safely capable of and is suspected to greatly shorten their useful life below the typical 40 hours. One plasma spray nozzle (labeled GH36) was subjected to about 30 minutes of normal use. Normal use constituted spray parameters (current, gas flow rates) that allowed the guns to last for their typical useful lifespan of about 40 hours.

Figure 6A:
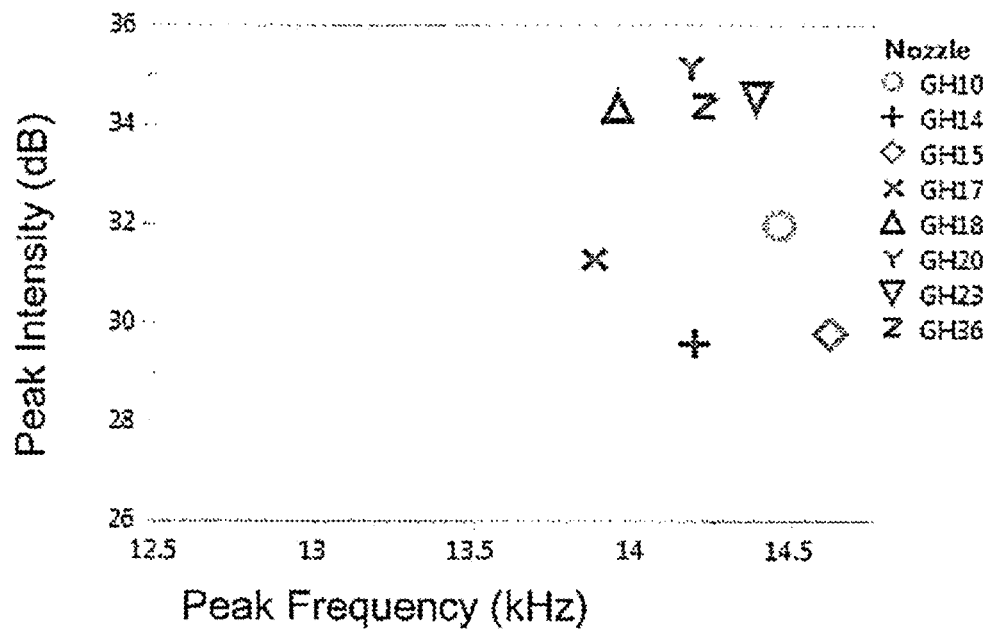
FIG. 6A is a chart presenting intensities of peak frequencies exhibited by plasma spray nozzles before use.
Figure 6B:
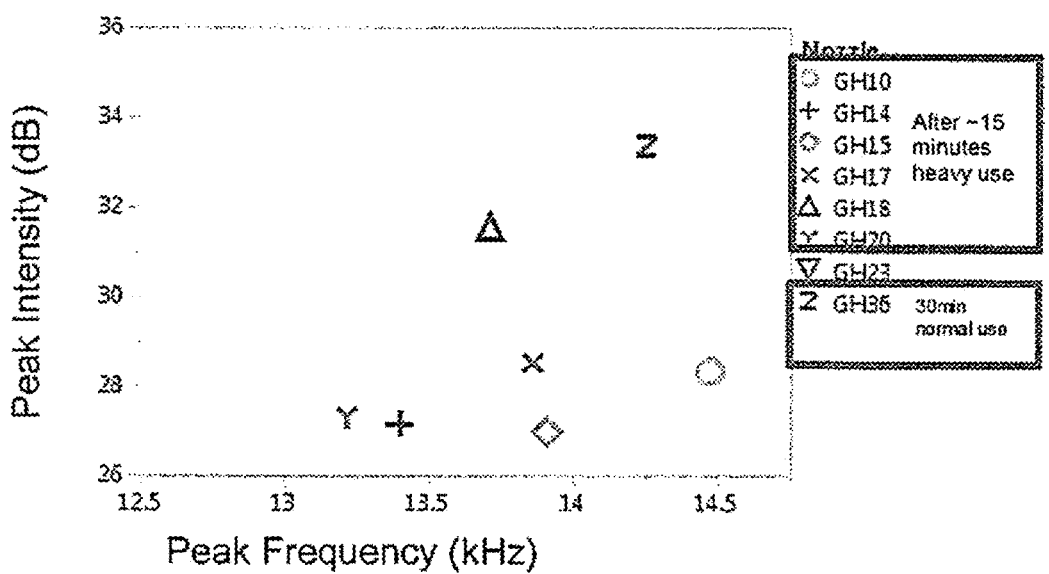
FIG. 6B is a chart presenting intensities of peak frequencies exhibited by plasma spray nozzles after use.

The acoustic signal generated by each of the plasma spray nozzles was transformed to a frequency-domain spectrum. Within a selected frequency band of about 12.5 kHz to about 15 kHz the peak frequencies and peak intensities associated with each nozzle before and after use were identified. FIG. 6A is a chart presenting intensities of peak frequencies exhibited by the plasma spray nozzles before use. FIG. 6B is a chart presenting intensities of peak frequencies exhibited by plasma spray nozzles after use. Nozzles GH10, GH14, GH15, GH17, GH18, and GH20 exhibited a reduction in peak intensity after about 15 minutes of heavy use. GH14, GH15 and GH20 exhibited a reduction in peak frequency, while GH10, GH14, GH17 and GH18 exhibited an increase in peak frequency after about 15 minutes of heavy use. GH36 exhibited a decrease in the peak intensity, while exhibiting an increase in the peak frequency. Thus a frequency band of about 13 kHz to about 15 kHz is indicative of nozzle wear.

Example 4

Figure 7:
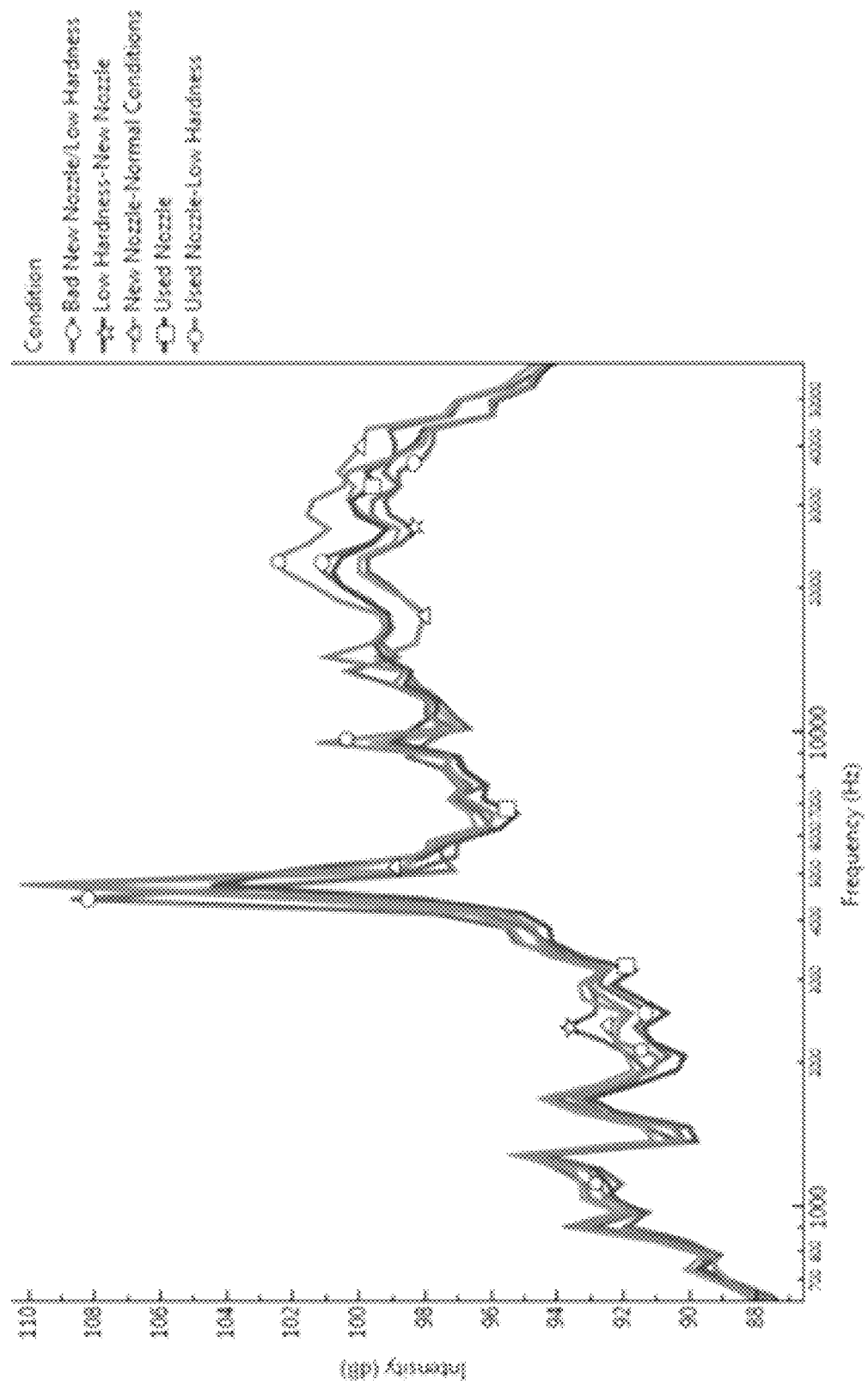
FIG. 7 is a chart presenting baseline frequency domain spectra associated with example thermal spray nozzles and a measured coating property.

Baseline spectra associated with spray nozzles in different conditions were determined. FIG. 7 is a chart presenting baseline frequency domain spectra associated with example thermal spray nozzles and a measured coating property. The respective baseline spectra were determined by obtaining averaged FFT of acoustic signals for example thermal spray nozzle. The low hardness noted in FIG. 7 for some examples was with reference to a measured coating property. Thus, at least two causes of changes to the thermal process were detected: nozzle wear, and an unknown change in the process that led to changes in acoustic signals.

The baseline spectra were used to determine the condition of test nozzles by comparing spectra of the test nozzles with each of the baseline spectra, and determining the closest spectrum of the spectra to be indicative of the condition of a respective test nozzle. Variations in the process resulting from unknown causes or sources could also identified, allowing for more reliable coating production.

The identification of the respective conditions of test nozzles based on a comparison between their respective acoustic signal samples and the baseline spectra are shown in TABLE 1.

TABLE 1

| Classification % | Predicted condition of test nozzle | Duration of audio signal (seconds) |
| --- | --- | --- |
| 99 | Defective new nozzle/low hardness | 1728 |
| 92 | Powder line leak - hole | 1146 |

TABLE 1-continued

| Classification % | Predicted condition of test nozzle | Duration of audio signal (seconds) |
|---|---|---|
| 99 | New nozzle - low hardness | 4303 |
| 81 | New nozzle - normal conditions | 5234 |
| 76 | Pulsing - carrier gas induced | 1149 |
| 97 | Pulsing - hose induced | 354 |
| 98 | Used nozzle | 6928 |
| 100 | Used nozzle - low hardness | 1653 |
| 95 | Worn port - 120% area | 256 |
| 78 | Worn port - 20% area | 1183 |

The results of the classification can be used for appropriate and immediate remediation.

Various examples have been described. These and other examples are within the scope of the following claims.

The invention claimed is:

1. A system comprising:
   at least one acoustic sensor configured to generate at least one time-dependent acoustic data signal indicative of an acoustic signal generated by a thermal spray system performing a process associated with a plurality of process attributes; and
   a computing device comprising:
      an acoustic data signal processing module configured to:
         receive the at least one time-dependent acoustic data signal, and
         transform the at least one time-dependent acoustic data signal to a frequency-domain spectrum, wherein each process attribute of the plurality of process attributes is associated with at least one respective frequency band; and
      a control module configured to:
         determine a process attribute of the plurality of process attributes that deviates from a predetermined operating range by:
            identifying at least one characteristic of the frequency-domain spectrum,
            at least one of comparing the at least one characteristic at a first interval of time with the at least one characteristic at a second interval of time to determine a difference, comparing the at least one characteristic at a third interval of time with a predetermined characteristic value range to determine the difference, or comparing the at least one characteristic at a fourth interval of time with a respective known characteristic of a known frequency-domain spectrum to determine the difference; and
            identifying, based on the difference, a deviation of the process attribute from the predetermined operating range,
            wherein the process attribute comprises at least one of:
               a process parameter comprising at least one of a temperature, a pressure, a mass flow rate, a volumetric flow rate, a molecular flow rate, a molar flow rate, a composition or a concentration, of a flowstream, or
               a process deviation status comprising at least one of powder pulsing, material feed fluctuation, flow blockage, gas leakage, or a process deviation resulting from incompatibility or wear of a system component,
         select at least one component of the thermal spray system based on the process attribute, wherein the at least one component is associated with the process attribute, and
         control the thermal spray system to adjust the process attribute toward the predetermined operating range by sending a control signal to the at least one component.

2. The system of claim 1, wherein the control module is further configured to determine the control signal by determining an offset for the process attribute based on the at least one characteristic and the predetermined operating range.

3. The system of claim 1, wherein the at least one characteristic comprises at least one of a peak frequency or a peak intensity.

4. The system of claim 1, wherein the control module is configured to determine at least one of the process attribute or the control signal by at least:
   extracting a plurality of intensities from a selected frequency band of the frequency-domain spectrum, each intensity of the plurality of intensities corresponding to a respective frequency of a plurality of frequencies within the selected frequency band, and
   selecting at least one peak intensity of the plurality of intensities or a respective peak frequency associated with the peak intensity as the at least one characteristic.

5. The system of claim 1, wherein the control module is further configured to determine the control signal based on the difference by determining the control signal configured to reduce the difference to restore the process attribute toward the predetermined operating range.

6. The system of claim 1, wherein the system component comprises at least one of a thermal spray gun, a plasma electrode, a powder port, or a material inlet port.

7. The system of claim 6, wherein the process parameter or the process deviation status is associated with the system component.

8. The system of claim 1, wherein the computing device further comprises an output device configured to output a representation of at least one of the at least one time-dependent acoustic data signal, the frequency-domain spectrum, the at least one characteristic of the frequency-domain spectrum, or the process attribute of which the at least one characteristic is indicative.

9. The system of claim 1, wherein the process comprises at least one of spraying, gas combustion, electrical arcing, plasma generation, flow shock, powder transport, or mechanical motion.

10. A method comprising:
    receiving, by a computing device, from at least one acoustic sensor, at least one time-dependent acoustic data signal indicative of an acoustic signal generated by a thermal spray system performing a process associated with a plurality of process attributes;
    transforming, by the computing device, the at least one time-dependent acoustic data signal to a frequency-domain spectrum, wherein each process attribute of the plurality of process attributes is associated with at least one respective frequency band;
    determining, by the computing device, a process attribute of the plurality of process attributes that deviates from a predetermined operating range by:
       identifying at least one characteristic of the frequency-domain spectrum,
       at least one of comparing the at least one characteristic at a first interval of time with the at least one characteristic at a second interval of time to determine a difference, comparing the at least one characteristic at a third interval of time with a predetermined characteristic value range to determine the difference, or comparing the at least one characteristic at a fourth interval of time with a respective known characteristic of a known frequency-domain spectrum to determine the difference; and identifying, based on the difference, a deviation of the process attribute from the predetermined operating range, wherein the process attribute comprises at least one of:
a process parameter comprising at least one of a temperature, a pressure, a mass flow rate, a volumetric flow rate, a molecular flow rate, a molar flow rate, a composition or a concentration, of a flow-stream, or
a process deviation status comprising at least one of powder pulsing, material feed fluctuation, flow blockage, gas leakage, or a process deviation resulting from incompatibility or wear of a system component;

selecting, by the computing device, at least one component of the thermal spray system based on the process attribute, wherein the at least one component is associated with the process attribute; and controlling, by the computing device, the thermal spray system to adjust the process attribute toward the predetermined operating range by sending a control signal to the at least one component.

11. The method of claim 10, further comprising determining, by the computing device, the control signal based on the at least one characteristic.

12. The method of claim 11, wherein determining the control signal comprises determining, by the computing device, an offset for the process attribute based on the at least one characteristic and the predetermined operating range.

13. The method of claim 10, wherein the at least one characteristic comprises at least one of a peak frequency or a peak intensity.

14. The method of claim 10, wherein determining the process attribute comprises:
extracting a plurality of intensities from a selected frequency band of the frequency-domain spectrum, each intensity of the plurality of intensities corresponding to a respective frequency of a plurality of frequencies within the selected frequency band; and
selecting at least one peak intensity of the plurality of intensities or a respective peak frequency associated with the peak intensity as the at least one characteristic.

15. The method of claim 10, wherein determining the control signal comprises determining, based on the difference, the control signal configured to reduce the difference to restore the process attribute toward the predetermined operating range.

16. A non-transitory computer readable storage medium comprising instructions that, when executed, cause at least one processor to:
receive, from at least one acoustic sensor, at least one time-dependent acoustic data signal indicative of an acoustic signal generated by a thermal spray system performing a process associated with a plurality of process attributes;
transform the at least one time-dependent acoustic data signal to a frequency-domain spectrum, wherein each process attribute of the plurality of process attributes is associated with at least one respective frequency band;
determine a process attribute of the plurality of process attributes that deviates from a predetermined operating range by:
identifying at least one characteristic of the frequency-domain spectrum,
at least one of comparing the at least one characteristic at a first interval of time with the at least one characteristic at a second interval of time to determine a difference, comparing the at least one characteristic at a third interval of time with a predetermined characteristic value range to determine the difference, or comparing the at least one characteristic at a fourth interval of time with a respective known characteristic of a known frequency-domain spectrum to determine the difference; and
identifying, based on the difference, a deviation of the process attribute from the predetermined operating range,
wherein the process attribute comprises at least one of:
a process parameter comprising at least one of a temperature, a pressure, a mass flow rate, a volumetric flow rate, a molecular flow rate, a molar flow rate, a composition or a concentration, of a flow-stream, or
a process deviation status comprising at least one of powder pulsing, material feed fluctuation, flow blockage, gas leakage, or a process deviation resulting from incompatibility or wear of a system component;
select at least one component of the thermal spray system based on the process attribute, wherein the at least one component is associated with the process attribute; and
control the thermal spray system to adjust the process attribute toward the predetermined operating range by sending a control signal to the at least one component.

* * * * *